(12) United States Patent
Coatney (10) Patent No.: US 7,340,642 B1
(45) Date of Patent: Mar. 4, 2008

(54) METHOD AND AN APPARATUS TO MAINTAIN STORAGE DEVICES IN A STORAGE SYSTEM

(75) Inventor: Douglas W. Coatney, Cupertino, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 606 days.

(21) Appl. No.: 10/837,392

(22) Filed: Apr. 30, 2004

(51) Int. Cl.
*G06F 11/00* (2006.01)

(52) U.S. Cl. .................... 714/7; 714/5; 714/6; 711/114

(58) Field of Classification Search .................... 714/7
See application file for complete search history.

(56) References Cited

U.S. PATENT DOCUMENTS

| | | | |
|---|---|---|---|
| 6,209,060 B1 * | 3/2001 | Machida | 711/114 |
| 6,295,591 B1 * | 9/2001 | Bealkowski et al. | 711/165 |
| 6,728,833 B2 * | 4/2004 | Pruett et al. | 711/114 |
| 6,907,504 B2 * | 6/2005 | Burton et al. | 711/162 |
| 6,959,399 B2 * | 10/2005 | King et al. | 714/6 |
| 7,032,218 B2 * | 4/2006 | Shirasawa et al. | 717/168 |
| 7,093,088 B1 * | 8/2006 | Todd et al. | 711/162 |
| 2003/0212856 A1 * | 11/2003 | Nichols | 711/114 |
| 2005/0138615 A1 * | 6/2005 | Farkas et al. | 717/168 |
| 2007/0079170 A1 * | 4/2007 | Zimmer et al. | 714/6 |

* cited by examiner

*Primary Examiner*—Christopher McCarthy
(74) *Attorney, Agent, or Firm*—Blakely Sokoloff Taylor & Zafman LLP (57) ABSTRACT

A method and an apparatus to maintain storage devices in a storage system have been disclosed. In one embodiment, the method includes logically migrating a storage device out of a set of storage devices storing data in a storage system without physically decoupling the storage device from the storage system and performing a maintenance operation on the storage device without interrupting storage service provided by the storage system.

30 Claims, 5 Drawing Sheets

METHOD AND AN APPARATUS TO MAINTAIN STORAGE DEVICES IN A STORAGE SYSTEM

FIELD OF INVENTION

The present invention relates to storage systems, and more particularly, to maintaining storage devices within a storage system.

BACKGROUND

A storage system may include one or more storage servers, which may include one or more storage appliances. A storage server may provide services related to the organization of data on storage devices, such as disks. Some of these storage servers are commonly referred to as filers or file servers. An example of such a storage server is any of the Filer products made by Network Appliance, Inc. in Sunnyvale, Calif. The storage server may be implemented with a special-purpose computer or a general-purpose computer. Depending on the application, various storage systems may include different numbers of storage servers.

Figure 1A:
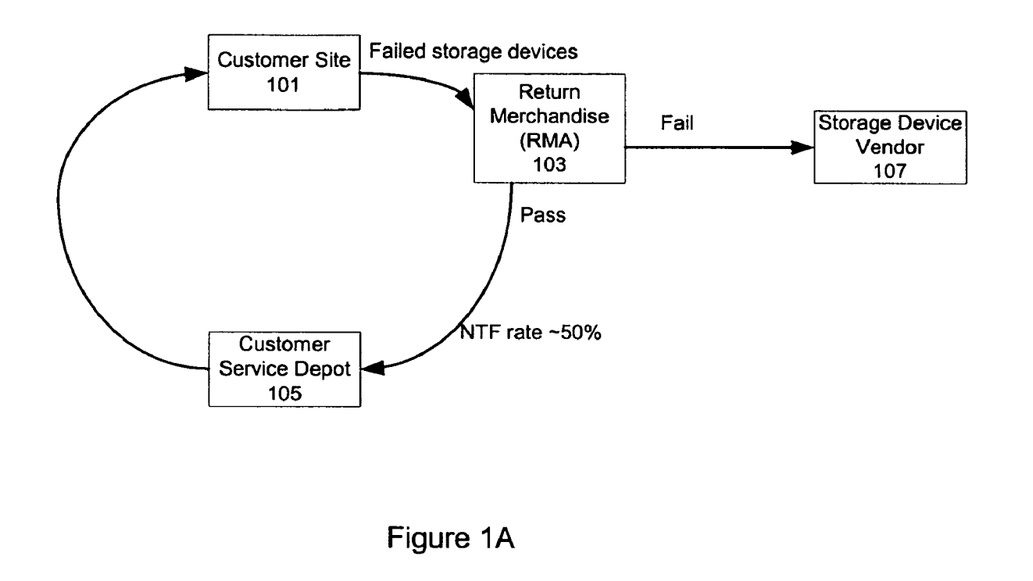
FIG. 1A illustrates an existing service route for storage devices in a conventional storage system.

In a storage system, there may be one or more Redundant Array of Independent Disks (RAID) subsystems. To improve the performance of the disks in a RAID subsystem, preventive maintenance work is performed on the disks periodically. For example, a disk may be periodically scanned for errors, such as media error or hardware error. Furthermore, if a media error is found in a sector of a disk, one technique merely reassigns data from the defective sector to another sector on the disk. However, simply reassigning the defective sector may not allow the disk to return to error free operation. For instance, a disk having experienced a predetermined number of a particular type of error may need to be physically removed from the system and returned to the vendor for major repair. FIG. 1A shows an existing service route map for an exemplary storage system deployed at a customer site.

Referring to FIG. 1A, the route may include four stops, which may be located in different sites. The four stops in FIG. 1A include the customer site 101, a return merchandise site 103, a customer service depot 105, and a site of a storage device vendor 107. The exemplary storage system including a number of storage devices (e.g., disks) is deployed at the customer site 101. When the customer reports detection of media errors on a storage device, which may be referred to as a failed storage device, the failed storage device is physically decoupled from the storage system and shipped to the return merchandise site 103.

At the return merchandise site 103, the failed storage device is tested again to confirm that one or more media errors exist on the failed storage device. If the storage device fails the test at the return merchandise site 103 again, the media error is confirmed and the storage device is shipped to the vendor of the storage device at the site 107 for repair. Otherwise, the storage device is passed and shipped to the customer service depot 105, which is typically at a different location from the return merchandise site 103. The storage devices shipped to the customer service depot 105 may be shipped back to the customer site 101 to be re-coupled to the storage system at the customer site 101. Alternatively, the storage devices may be shipped from the customer service depot 105 to other customers' sites to be integrated into the storage systems at those sites.

The percentage of storage devices passed at the return merchandise site 103 out of the failed storage devices shipped to the return merchandise site 103 may be referred to as the Not-To-Fail (NTF) rate. In one existing system, the NTF rate can reach approximately 50%. The higher the NTF rate, the higher the cost of servicing the storage system at the customer site 101 because more functioning storage devices are shipped from the customer site 101 to the return merchandise site 103 and the customer service depot 105 unnecessarily. Besides the cost in shipping the storage devices, another problem is that physically moving the storage devices increases the risk of causing mechanical damages to the storage devices moved.

Besides scanning for errors, some of the storage devices today use firmware, which may be upgraded from time to time. However, it is difficult to upgrade the firmware of a storage device when the storage device is a member of a redundancy group (e.g., a RAID group) because downloading the firmware to the storage device would require a service outage in the redundancy group.

SUMMARY

The present invention includes a method and an apparatus to maintain storage devices in a storage system. In one embodiment, the method includes logically migrating a storage device out of a set of storage devices storing data in a storage system without physically decoupling the storage device from the storage system and performing a maintenance operation on the storage device without interrupting storage service provided by the storage system.

In a specific embodiment, the maintenance operation includes upgrading firmware of the storage device if an upgrade of the firmware is available.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and an apparatus to maintain storage devices in a storage system are described. In the following description, numerous specific details are set forth. However, it is understood that embodiments of the invention may be practiced without these specific details. In other instances, well-known components, structures, and techniques have not been shown in detail in order not to obscure the understanding of this description.

Some portions of the following detailed description are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Figure 1B:
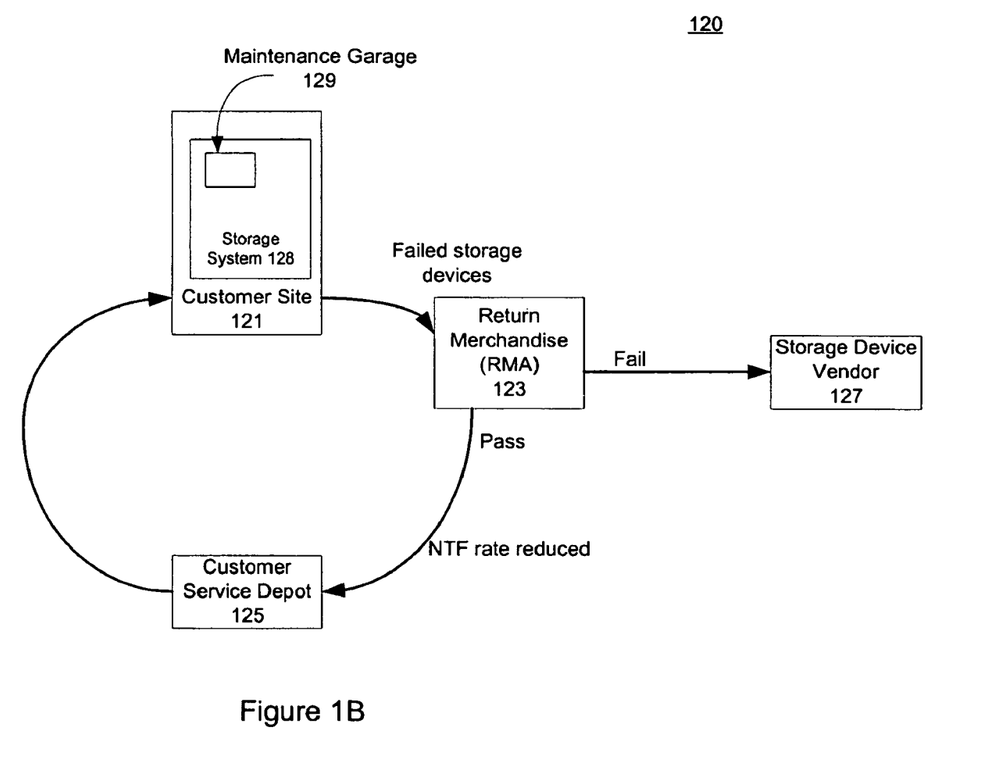
FIG. 1B illustrates one embodiment of a service route for storage devices in an exemplary storage system.

FIG. 1B illustrates one embodiment of a service route map for storage devices in an exemplary storage system. The route 120 includes four stops, namely, a customer site 121, a return merchandise site 123, a site of the storage device vendor 127, a customer service depot 125. A storage system 128 is deployed at the customer site 121. Furthermore, the storage system 128 includes a logical maintenance garage 129 to service the storage devices (e.g., disks) in the storage system 128. For example, when a media error is reported on one of the storage devices in the storage system 128, the storage device is logically migrated into the maintenance garage 129 without being physically decoupled from the storage system 128. The storage device may be tested in the maintenance garage 129 to confirm the media error. If the media error is confirmed, the storage device is physically decoupled from the storage system 128 and shipped to the return merchandise site 123. Otherwise, the storage device may be returned to the storage system 128 as a spare storage device.

In one embodiment, the storage device is tested again at the return merchandise site 123. If the storage device fails, the storage device is shipped to the storage device vendor 127 for repair. Otherwise, the storage device is shipped to the customer service depot 125 to be returned to customer systems, such as the storage system 128 at the customer site 121.

Since the storage device is not physically decoupled from the storage system 128 without confirming the media error reported, the maintenance garage 129 helps to prevent shipping functional storage devices mistakenly to the return merchandise site 123. Hence, the NTF rate of the storage devices shipped to the return merchandise site 123 may be reduced. In one embodiment, the NTF rate is reduced to approximately 0%. By reducing the NTF rate, the cost in servicing the storage devices in the storage system 128 may be reduced by cutting down the number of functional storage devices being shipped from the customer site 121. Furthermore, the storage devices are susceptible to mechanical damages when physically moved. Therefore, by locally confirming reported media errors on a storage device before shipping the storage device to a different site, the risk of mechanically damaging the storage devices may be reduced.

In addition to, or as an alternatively to, confirming media errors reported on storage devices, some embodiments of the maintenance garage 129 provide other services to the storage devices in the storage system 128. More detail of some exemplary embodiments of the maintenance garage 129 is discussed below.

Figure 1C:
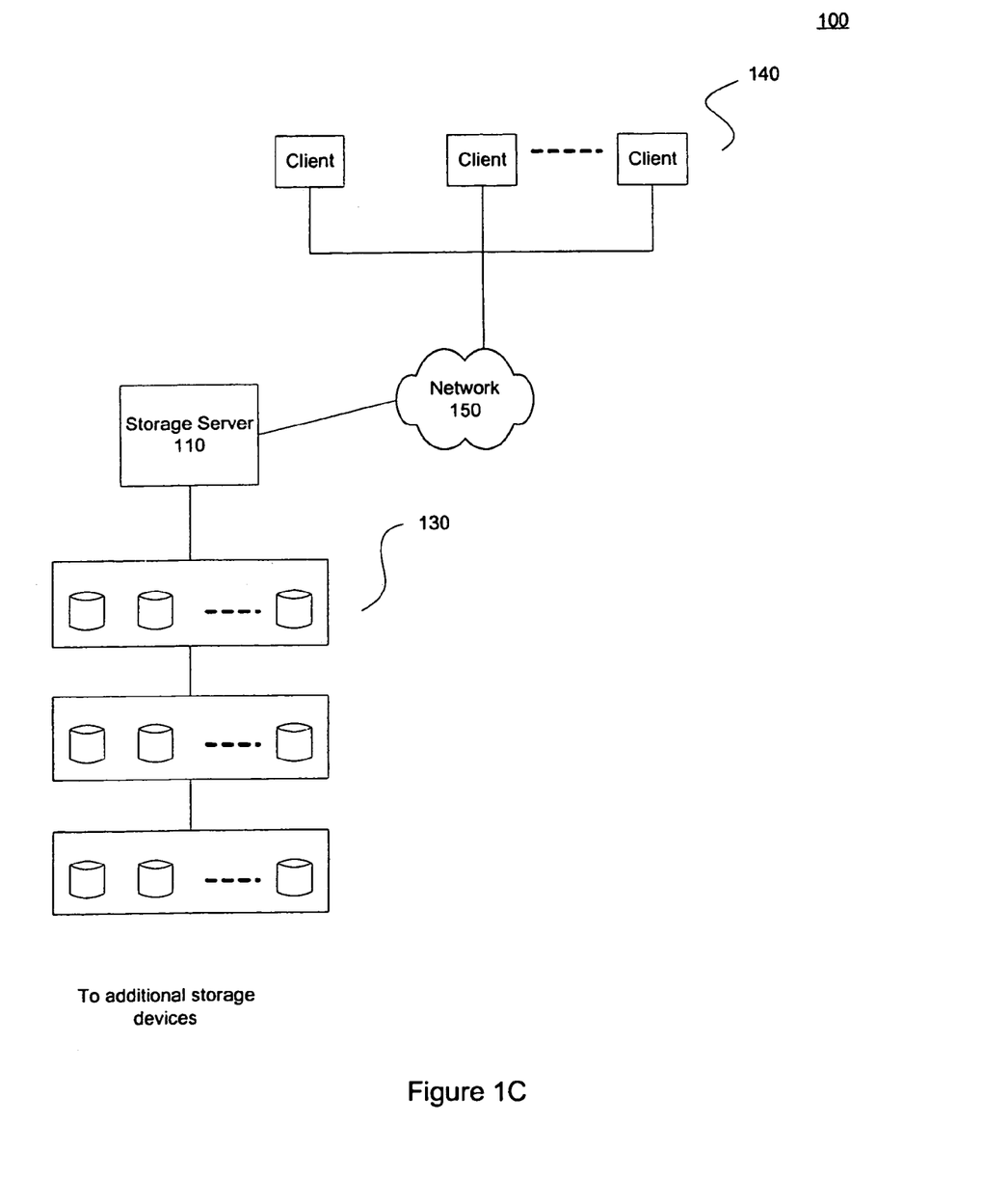
FIG. 1C illustrates one embodiment of a storage system.

FIG. 1C shows one embodiment of the storage system 128 in FIG. 1B. Referring to FIG. 1C, the storage system 100 includes a storage server 110, a network 150, a number of storage devices 130 coupled to the storage server 110, and a number of client machines 140 coupled to the storage server 110 via the network 150. The network 150 may include a wide area network (WAN), a local area network (LAN), etc. The storage devices 130 may include a number of disks organized in shelves. The disks may include one or more Redundant Array of Independent Disks (RAID) volumes.

Note that any or all of the components of system 100 and associated hardware may be used in various embodiments of the present invention. However, it can be appreciated that other configurations of the storage system may include some or all of the devices disclosed above.

In one embodiment, the system 100 includes a storage area network (SAN) to transmit read/write requests at the block level of the storage server 110. A block is the basic unit used to store data in the SAN. In an alternate embodiment, the system 100 is a network-attached storage (NAS) system that transmits data at the file level. In the NAS system, complete files are retrieved instead of segments on a disk. The NAS system uses file access protocols to retrieve data, such as, for example, Network File System (NFS), or Common Internet File System (CIFS). Alternatively, some embodiments can combine NAS and SAN systems. The SAN and the NAS systems may be implemented in a single server or separate servers.

The storage server 110 may provide a logical maintenance garage to maintain the storage devices 130. In one embodiment, one of the storage devices 130 is logically migrated to the logical maintenance garage. One or more maintenance operations may be performed on the migrated storage device without interrupting storage service provided by the storage system, such as servicing read and/or write requests from the client machines 140. More detail of various embodiments of the storage server 110 is discussed below.

Figure 2:
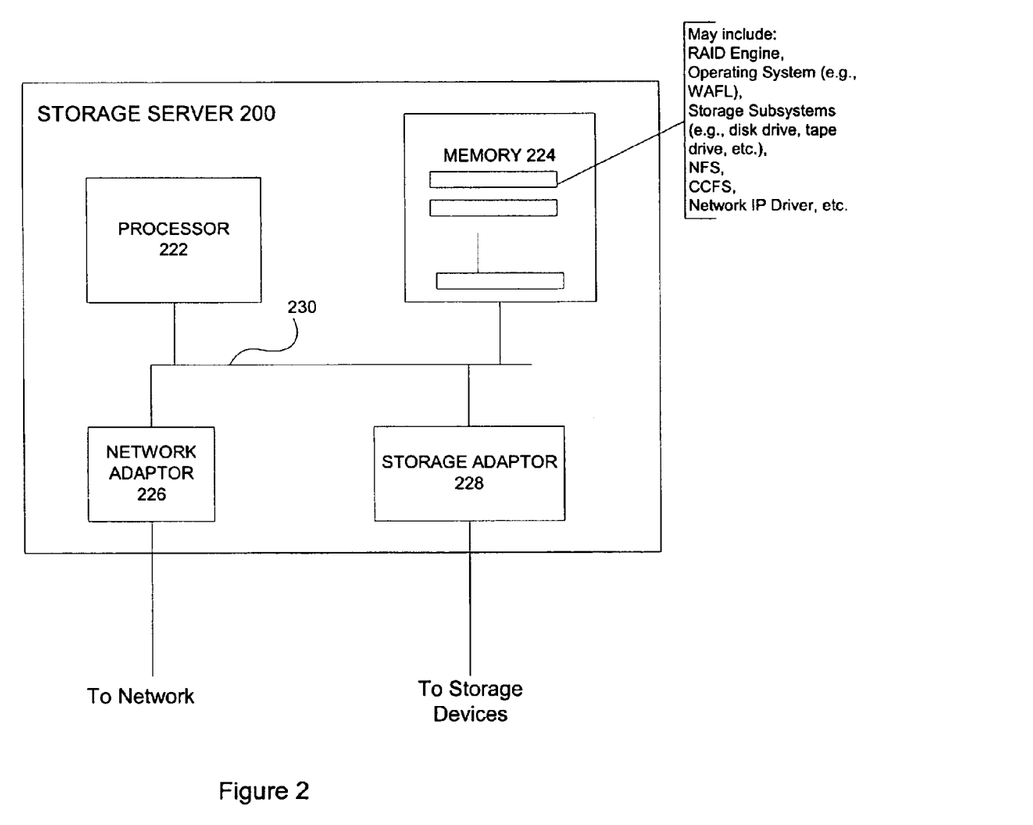
FIG. 2 illustrates one embodiment of a storage server.

FIG. 2 illustrates one embodiment of a storage server in a storage system. The storage server 200 includes a processor 222, a memory 224, a network adaptor 226, and a storage adaptor 228, which are coupled to each other via a bus 230. In one embodiment, the storage server 200 is within a network and the network adaptor 226 interfaces with the network. The network may include a local area network (LAN), or a wide area network (WAN), etc. Data is transmitted between the storage server 200 and the network via the network adaptor 226. When data is received, the network adaptor 226 may forward the data to the storage adaptor 228, the memory 224, or the processor 222.

In one embodiment, the processor 222 reads instructions from the memory 224 and executes the instructions. The memory 224 may include any of various types of memory devices, such as, for example, random access memory (RAM), read-only memory (ROM), flash memory, one or more mass storage devices (e.g., disks), etc. In one embodiment, the memory 224 stores instructions of various software running on the storage server 200, such as a RAID Engine, an operating system (e.g., Write Anywhere File Layout (WAFL) system provided by Network Appliance of Sunnyvale, Calif.), storage subsystems (e.g., driver of disk drives, driver of tape drives, etc.), Network File System (NFS) applications, Network Internet Protocol (IP) Driver, etc. The processor 222 responds to requests from client machines, the network management station, or other storage servers and organizes data on the storage devices (e.g., disks) coupled to the storage server 200. The storage server 200 interfaces with the storage devices via the storage adaptor 228. The storage adaptor 228 may be coupled to the storage devices via one or more interconnects, such as Fibre Channel, Small Computer System Interface (SCSI), etc.

Figure 3:
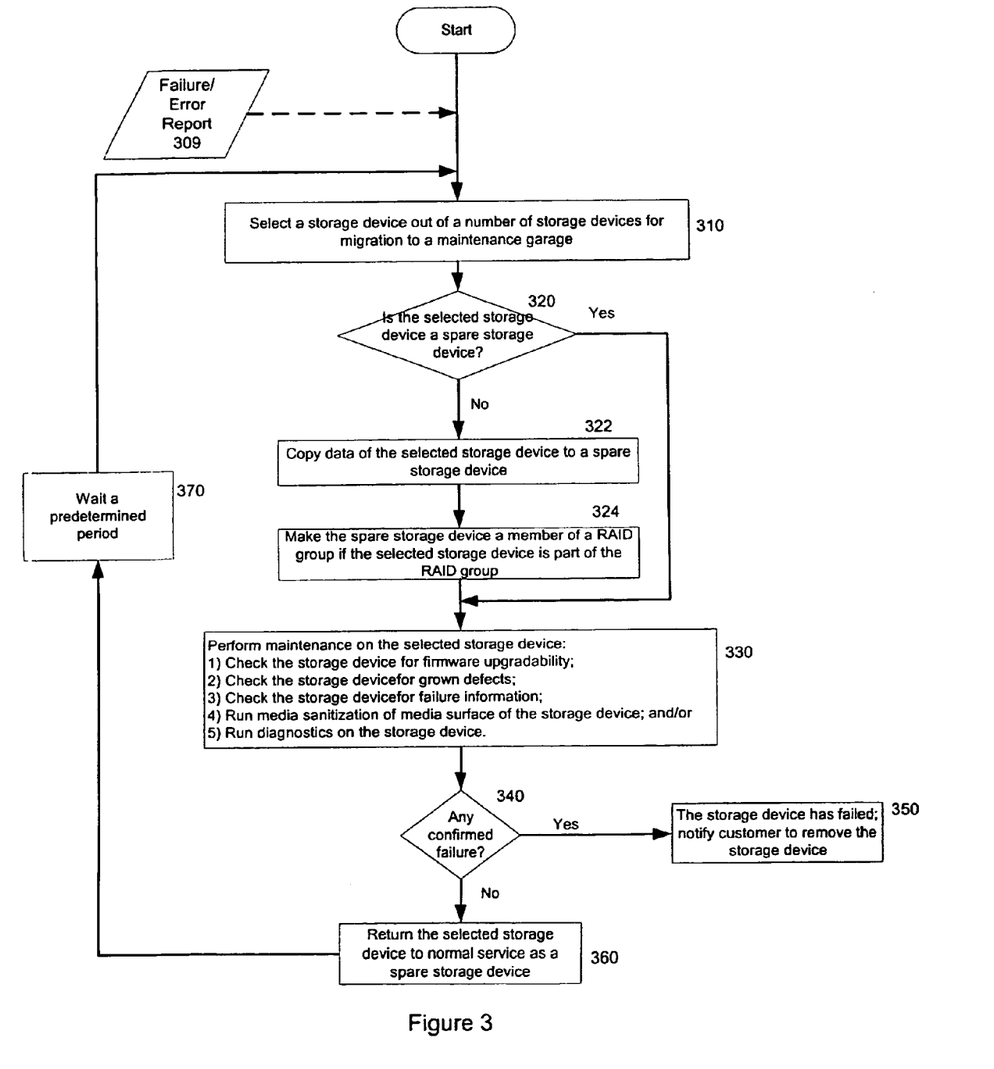
FIG. 3 illustrates a flow diagram of one embodiment of a process to maintain storage devices in a storage system.

FIG. 3 illustrates a flow diagram of one embodiment of a process to maintain storage devices (e.g., disks) in a storage system. The process is performed by processing logic that may comprise hardware (e.g., circuitry, dedicated logic, etc.), software (such as is run on a general-purpose computer system or a dedicated machine, such as a storage server), or a combination of both.

In one embodiment, various states may be defined for the storage devices. For example, when a storage device is used as a member within a RAID group to store data, the storage device is in an in-use state. When the storage device serves as a spare storage device, the storage device is in a spare state. When errors (e.g., hardware errors, media errors) are detected on the storage device and the errors cannot be recovered, the storage device is in a failed state. When the storage device is in a logical maintenance garage, the storage device is in a maintenance state. The storage device in the maintenance state may not store data or serve as a spare. However, a number of predetermined operations may be performed on the storage device to maintain or to remedy the storage device.

Referring to FIG. 3, processing logic selects a storage device out of a number of storage devices and logically migrates the selected storage device to a logical maintenance garage (processing block 310). In one embodiment, labels corresponding to the various states of the storage devices are defined. To logically migrate the selected storage device, processing logic may write the label corresponding to the maintenance state into a predetermined location on the storage device. For example, the label may be written in a non-volatile memory (e.g., a flash memory) on the storage device. However, the storage device is not physically removed or decoupled from the system when the storage device is logically migrated to the logical maintenance garage.

In one embodiment, processing logic selects the storage device in response to a failure or error report 309. Alternatively, processing logic may select the storage device based on one or more criteria. For example, processing logic may select the storage device based on the speed of the storage devices such that the slower storage devices are logically migrated first. In an alternate embodiment, processing logic simply selects the storage devices sequentially.

Alternatively, processing logic may select the storage device based on a topology of the storage devices in order to achieve a more balanced topology. The topology of the storage devices is the geometric configuration of the storage devices in a redundancy group (e.g., a RAID group). For example, an exemplary RAID group may have seven disks logically arranged in two columns, where a first column has five disks and a second column has two disks. Such topology is unbalanced because the first column has more disks than the second column. According to one embodiment of the present invention, processing logic may select one of the disks from the first column to logically migrate to the logical maintenance garage so that four disks remain in the first column. Processing logic may copy the data from the selected disk to a spare disk and put the spare disk into the second column to make the spare disk a member of the RAID group. Thus, the resultant RAID group has four disks in the first column and three disks in the second column. Such topology resulted is more balanced than the topology before the migration because the difference between the number of disks in the two columns is smaller after the migration.

Referring back to FIG. 3, processing logic then checks whether the selected storage device is a spare storage device in the storage system (processing block 320). If the selected storage device is a spare storage device, processing logic may proceed to processing block 330. If the selected storage device is not a spare storage device, then the storage device may be a member in a RAID group. To avoid disrupting the services provided by the RAID group, processing logic copies the data on the selected storage device to a spare storage device (processing block 322). Processing logic then logically swap the two storage devices to make the spare storage device a member of the RAID group instead (processing block 324).

Processing logic then performs one or more maintenance operations on the selected storage device (processing block 330). Some examples of the maintenance operations include checking the storage device for firmware upgradability and upgrading the firmware of the storage device if an upgrade is available. The maintenance operations may further include running media sanitization on the storage device. In one embodiment, the media sanitization of the storage device is implemented by writing one or more predetermined data patterns on the storage device such that the data previously deleted from the storage device cannot be retrieved from the storage device. Another example of the maintenance operations is causing the storage device to perform a self-diagnostic routine if the storage device supports self-diagnosis.

In one embodiment, the maintenance operations include checking the storage device for errors (e.g., media error, hardware error, etc.) and/or checking the storage device for failure information. In some storage devices, information on errors and/or failures detected is stored in a non-volatile memory (e.g., a flash memory) on the storage device. For example, the type, the frequency, or the location of the errors and/or failures may be stored in the non-volatile memory. If a hardware error is confirmed, processing logic may fail the storage device. On the contrary, if a media error is confirmed, processing logic may reassign the data in the affected sector to another sector on the storage device without failing the storage device. However, if the number of media errors on the storage device has exceeded a predetermined threshold, processing logic may fail the storage device.

It should be appreciated that the above examples are described for the purpose of illustration, and therefore, the above examples do not exhaust all possible maintenance operations that can be performed on storage devices in the logical maintenance garage. Furthermore, one should appreciate that some embodiments of the process may include some or all of the above maintenance operations.

Since operations for detecting or confirming errors and/or failures on storage devices may be performed on the storage devices while the storage devices are in the logical maintenance garage, the logical maintenance garage can be implemented for remote diagnostics of the storage devices. Remote diagnostics of the storage devices refers to performing diagnosis on the storage device at a physical location remote from a storage device service provider. For example, the storage devices in a storage system deployed at a remote site, such as a storage system at one physical location (e.g., Los Angeles), or at another facility, can be diagnosed using the logical maintenance garage without shipping the storage devices to the storage device service provider at a different physical location (e.g., San Jose).

After performing the maintenance operations, processing logic checks whether the storage device has failed (processing block 340). If the storage device has failed, processing logic notifies a user to physically remove the storage device from the storage system for repair (processing block 350). The removed storage device may be returned to a vendor of the storage device for repair. If the storage device has not failed, processing logic returns the storage device to normal service in the storage system as a spare storage device (processing block 360).

After performing the maintenance operations on the storage device, processing logic may wait a predetermined period of time (processing block 370) before transitioning back to processing block 310. In other words, processing logic may select a storage device to logically migrate to the logical maintenance garage periodically. Alternatively, processing logic may repeat processing blocks 310-360 on a storage device in response to a report 309 of a failure or an error on the storage device. In one embodiment, the logical migration of a storage device is performed both periodically and in response to a failure or error report.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A method comprising:

logically migrating a storage device out of a plurality of storage devices storing data in a storage system without physically decoupling the storage device from the storage system, said logically migrating the storage device comprising selecting the storage device based on a geometric configuration of the plurality of storage devices;

performing a maintenance operation on the storage device without interrupting storage service provided by the storage system;

returning the migrated storage device to the plurality of storage devices as a spare storage device in the storage system after performing the maintenance operation on the storage device if the storage device does not fail; and notifying a user to remove the storage device from the storage system after performing the maintenance operation on the storage device if the storage device fails.

2. The method of claim 1, wherein the plurality of storage devices includes a Redundant Array of Independent Disks (RAID) group and a spare storage device.

3. The method of claim 2, wherein logically migrating the storage device comprises:

selecting the storage device out of the RAID group;

copying data from the selected storage device to the spare storage device; and replacing the selected storage device with the spare storage device in the RAID group.

4. The method of claim 3, wherein selecting the storage device comprises selecting the storage device based on a speed of each of the plurality of the storage devices.

5. The method of claim 1, wherein the maintenance operation comprises:

checking firmware upgradability of the storage device; and upgrading firmware of the storage device if an upgrade of the firmware is available.

6. The method of claim 1, wherein the maintenance operation comprises checking the storage device to confirm a reported error in the storage device.

7. The method of claim 6, wherein the error includes a media error.

8. The method of claim 6, wherein the error includes a hardware error.

9. The method of claim 1, wherein the maintenance operation comprises checking the storage device for failure information, which includes statistics on errors found in the storage device.

10. The method of claim 1, wherein the maintenance operation comprises causing the storage device to run a self-diagnostic routine.

11. The method of claim 1, wherein the maintenance operation comprises writing a plurality of data patterns on the storage device to sanitize the storage device.

12. A method comprising:

in response to an error report on a storage device, logically migrating the storage device out of a plurality of storage devices storing data in a storage system without physically decoupling the storage device from the storage system;

checking the migrated storage device to verify the error report without interrupting data service provided by the storage system;

returning the migrated storage device to the plurality of storage devices as a spare storage device in the storage system if the error report is not confirmed; and notifying a user to remove the storage device from the storage system if the error report is confirmed.

13. The method of claim 12, wherein the error report indicates a media error in the storage device.

14. The method of claim 12, wherein the error report indicates a hardware error in the storage device.

15. A computer readable storage medium that stores instructions which, if executed by a processor, will cause the processor to perform operations comprising:

logically migrating a storage device out of a plurality of storage devices storing data in a storage system periodically without physically decoupling the storage device from the storage system;

performing a maintenance operation on the storage device without interrupting storage service provided by the storage system;

returning the storage device to the plurality of storage devices as a spare storage device in the storage system if the storage device has no error; and notifying a user to remove the storage device from the storage system if an error is found in the storage device, wherein the error may include a media error or a hardware error in the storage device.

16. The computer readable storage medium of claim 15, wherein the maintenance operation comprises:

checking firmware upgradability of the storage device; and upgrading firmware of the storage device if an upgrade of the firmware of the storage device is available.

17. The computer readable storage medium of claim 15, wherein the maintenance operation comprises checking the storage device for error.

18. The computer readable storage medium of claim 15, wherein logically migrating the storage device comprises writing a maintenance state label in a predetermined location on the storage device.

19. An apparatus comprising:

a storage adaptor;

a memory device to store a plurality of instructions; and a processor, coupled to the memory device and the storage adaptor, to retrieve the plurality of instructions from the memory device and, in response to the plurality of instructions, to perform a plurality of operations comprising:

logically migrating a storage device out of a plurality of storage devices coupled to the storage adaptor to store data in a storage system without physically decoupling the storage device from the storage adaptor;

performing a maintenance operation on the storage device without interrupting storage service provided by the storage system;

returning the migrated storage device to the plurality of storage devices as a spare storage device in the storage system after performing the maintenance operation on the storage device if the maintenance operation is performed successfully; and notifying a user to remove the storage device from the storage system after performing the maintenance operation on the storage device if a defect is found in the storage device.

20. The apparatus of claim 19, wherein the defect includes a media error on the storage device.

21. The apparatus of claim 19, wherein the defect includes a hardware error on the storage device.

22. The apparatus of claim 19, wherein the maintenance operation includes downloading updated firmware to the storage device.

23. The apparatus of claim 19, wherein the maintenance operation includes checking the storage device for defect.

24. The apparatus of claim 19, wherein the maintenance operation includes sanitizing the storage device.

25. The apparatus of claim 19, wherein the maintenance operation includes causing the storage device to run a self-diagnostic routine.

26. A storage system comprising:

a plurality of storage devices;

a storage server, coupled to the storage devices, to provide storage service, the storage server comprising:

a memory device to store a plurality of instructions; and a processor, coupled to the memory device, to retrieve the plurality of instructions from the memory device and, in response to the plurality of instructions, to perform a plurality of operations comprising:

logically migrating a storage device out of the plurality of storage devices without physically decoupling the storage device from the storage server;

performing a maintenance operation on the storage device without interrupting the storage service provided;

logically returning the migrated storage device to the plurality of storage devices as a spare storage device after performing the maintenance operation on the storage device if the maintenance operation is performed successfully; and notifying a user to physically remove the storage device after performing the maintenance operation on the storage device if a defect is found in the storage device.

27. The storage system of claim 26, wherein the plurality of storage devices includes a Redundant Array of Independent Disks (RAID) group and a spare storage device.

28. The storage system of claim 27, wherein the maintenance operation comprises:

selecting the storage device out of the RAID group based on a predetermined criterion;

copying data from the selected storage device to the spare storage device; and making the spare storage device a member of the RAID group to replace the selected storage device.

29. A method comprising:

logically migrating a storage device out of a plurality of storage devices storing data in a storage system without physically decoupling the storage device from the storage system, the plurality of storage devices including a Redundant Array of Independent Disks (RAID) group and a spare storage device, wherein migrating the storage device comprises selecting the storage device based on a predetermined criterion, copying data from the selected storage device to the spare storage device, and replacing the selected storage device with the spare storage device in RAID group;

performing a plurality of maintenance operations on the storage device without interrupting storage service provided by the storage system, wherein the plurality of maintenance operations comprise:

checking firmware upgradability of the storage device;

downloading updated firmware to the storage device if an upgrade of a firmware of the storage device is available, checking the storage device to confirm a reported error in the storage device, wherein the reported error may include a hardware error or a media error in the storage device, checking the storage device for failure information, which includes statistics on errors found in the storage device, sanitizing the storage device, and causing the storage device to run a self-diagnostic routine;

designating the storage device as spare and returning the storage device to the plurality of storage devices after performing the plurality of maintenance operations on the storage device if the storage device does not fail; and notifying a user to remove the storage device from the storage system after performing the plurality of maintenance operations on the storage device if the storage device fails.

30. A method comprising:

means for logically migrating a storage device out of a plurality of storage devices storing data in a storage system without physically decoupling the storage device from the storage system;

means for performing a maintenance operation on the storage device without interrupting storage service provided by the storage system;

means for returning the migrated storage device to the plurality of storage devices as a spare storage device in the storage system after performing the maintenance operation on the storage device if the storage device does not fail; and means for notifying a user to remove the storage device from the storage system after performing the maintenance operation on the storage device if the storage device fails.

* * * * *